(12) United States Patent
Biester

(10) Patent No.: US 7,353,837 B2
(45) Date of Patent: Apr. 8, 2008

(54) PRESSURE REDUCER WITH ADJUSTABLE FLOW RESTRICTOR

(75) Inventor: Klaus Biester, Wienhausen (DE)

(73) Assignee: Cameron International Corporation, Houston, TX (US)

( * ) Notice: Subject to any disclaimer, the term of this patent is extended or adjusted under 35 U.S.C. 154(b) by 201 days.

(21) Appl. No.: 10/489,578

(22) PCT Filed: Sep. 18, 2002

(86) PCT No.: PCT/EP02/10487

§ 371 (c)(1),
(2), (4) Date: Jul. 28, 2004

(87) PCT Pub. No.: WO03/025439

PCT Pub. Date: Mar. 27, 2003

(65) Prior Publication Data

US 2005/0011561 A1 Jan. 20, 2005

(30) Foreign Application Priority Data

Sep. 19, 2001 (DE) .......................... 201 15 470 U

(51) Int. Cl.
*F16K 1/12* (2006.01)
(52) U.S. Cl. .................................... 137/219
(58) Field of Classification Search ............... 137/219, 137/625.28, 625.39, 625.38, 625.37, 625.33; 74/424.71
See application file for complete search history.

(56) References Cited

U.S. PATENT DOCUMENTS

| | | | | |
|---|---|---|---|---|
| 1,700,111 A | * | 1/1929 | Welcker | 137/220 |
| 1,777,060 A | * | 9/1930 | Welcker | 137/220 |
| 2,297,082 A | * | 9/1942 | Staats | 239/456 |
| 2,642,890 A |   | 6/1953 | Skewis | |

(Continued)

FOREIGN PATENT DOCUMENTS

DE        10 68 070        10/1959

(Continued)

OTHER PUBLICATIONS

Patent Abstracts of Japan vol. 007, No. 126 (M-219) May 31, 1983 and JP 58 042873 (1 p.).

(Continued)

*Primary Examiner*—Ramesh Kirshnamurthy
*Assistant Examiner*—Craig Schneider
(74) *Attorney, Agent, or Firm*—Conley Rose, P.C.

(57) ABSTRACT

A pressure reducer has a housing comprising an inlet and an outlet in which a flow-around body is arranged in a flow channel connecting inlet and outlet. A flow restrictor is adjustably mounted relative to the flow-around body for varying a flow rate and is movably connected with an adjusting means comprising a recirculating ball nut and a rotating spindle wherein the rotating spindle is movably connected with said flow restrictor. To improve such a pressure reducer that a corresponding flow restrictor with a facilitated construction is reliable and can exactly be adjusted in position, the recirculating ball nut is detachably fastened to a turning sleeve rotatably mounted in the flow-around body and the recirculating ball nut is connected with a driving toothed wheel in a rotation-resistant manner, which is rotatable by an electric drive for the movable connected with recirculating ball nut.

52 Claims, 2 Drawing Sheets

U.S. PATENT DOCUMENTS

Figure 1:
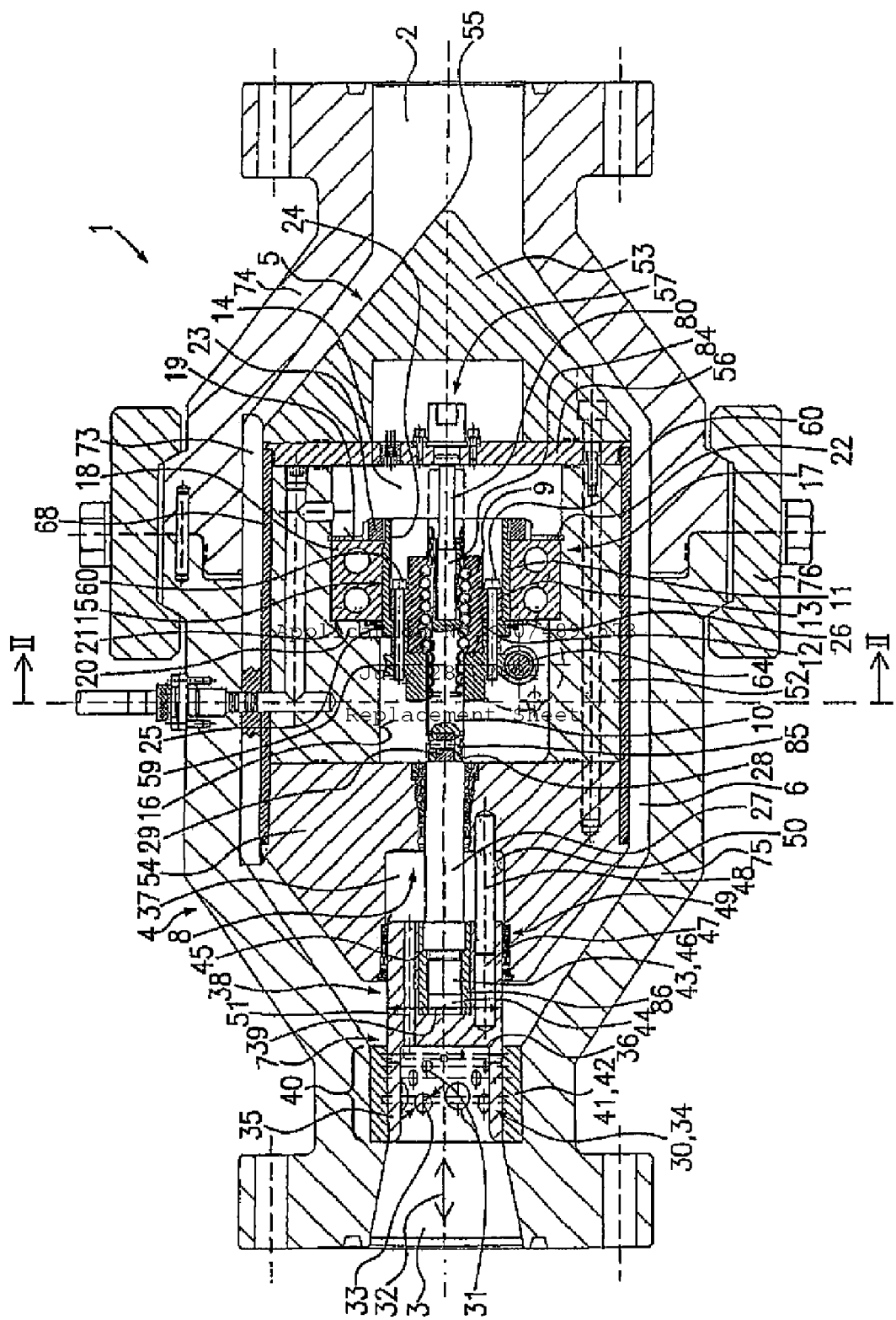

| | | | | |
|---|---|---|---|---|
| 2,784,730 | A | * | 3/1957 | Soomil ........................ 137/221 |
| 2,792,194 | A | * | 5/1957 | Huck ........................... 251/65 |
| 3,908,698 | A | * | 9/1975 | Baumann .................. 137/625.3 |
| 4,024,891 | A | * | 5/1977 | Engel et al. ............... 137/625.3 |
| 4,080,982 | A | * | 3/1978 | Maezawa .................... 137/219 |
| 5,180,193 | A | * | 1/1993 | Rung et al. .................... 285/55 |
| 5,224,512 | A | * | 7/1993 | Nogami et al. ............. 137/554 |
| 5,333,835 | A | * | 8/1994 | Smith et al. ............ 251/129.12 |
| 5,660,198 | A | * | 8/1997 | McClaran .................... 137/12 |
| 5,895,865 | A | * | 4/1999 | Ozawa .................... 73/861.73 |
| 6,116,107 | A | * | 9/2000 | Kafai ....................... 74/424.71 |
| 6,742,539 | B2 | * | 6/2004 | Lyons ........................ 137/219 |

FOREIGN PATENT DOCUMENTS

EP 0 383 353 7/1994

OTHER PUBLICATIONS

International Search Report for Appln. No. PCT/EP02/10487 dated Mar. 18, 2003 (pp. 8).

* cited by examiner

PRESSURE REDUCER WITH ADJUSTABLE FLOW RESTRICTOR

The invention relates to a pressure reducer with a housing comprising an inlet and an outlet, in which a flow-around body is arranged in a flow channel connecting inlet and outlet, wherein a flow restrictor is adjustably mounted relative to the flow-around body for varying a flow rate and is movably connected with an adjusting means.

Such a pressure reducer is known from DE 34 09 973. Such pressure reducers serve to regulate the flow rate of fluids, gases and/or mixtures of solid matters, and they are particularly arranged in the conveyor pipelines for oil recovery or natural gas extraction. Such a pressure reducer can be mounted in the conveyor pipeline as a separate component, and can be operated automatically, manually or via remote control. The individual parts of the pressure reducer are fabricated from particularly resistant materials, as the wear would otherwise be too high, for example, with oil/sand mixtures in the conveyor pipelines.

The flow-around body is disposed in the corresponding housing of the pressure reducer, and a needle serving as flow restrictor can be pushed out of the flow-around body so as to vary the flow rate. According to DE 34 09 973 the needle is associated with a hydraulic drive, for which a number of hydraulic pipelines are required for charging and discharging the corresponding hydraulic fluid.

The invention is based on the object to improve a pressure reducer of the aforementioned type such that a corresponding flow restrictor with a facilitated construction is reliable and can exactly be adjusted and positioned.

In connection with the features according to the preamble of claim 1 said object is provided in that the adjusting means comprises a recirculating ball nut rotatably mounted in the flow-around body and fixed substantially in an axial direction, as well as a rotating spindle mounted axially adjustable in the same, whereby the rotating spindle is movably connected with the flow restrictor.

By rotating the recirculating ball nut, the rotational movement thereof is converted into an axial movement of the rotating spindle, by which the flow restrictor is adjusted so as to vary the flow rate. The recirculating ball nut of the adjusting means can be rotated manually, automatically or also by remote control.

Such a threaded spindle-nut-drive formed by the recirculating ball nut and the rotating spindle is an excellent machine element for converting a rotary into a translatoric movement. Such an adjusting means has a very good mechanical efficiency due to the small rolling friction and no stick-slip effect. Moreover, the wear is extremely small and results in a long service life. Eventually, the heating is very small, and such an adjusting means brings about a high accuracy in view of positioning and repetition, namely due to zero backlash, and a high traverse rate.

By means of the adjusting means according to the invention, moreover, strong forces can be transmitted, so that a secure and exact positioning of the flow restrictor for adjusting a selected flow rate is feasible also at high pressures in the flow channel.

For being able to accommodate the recirculating ball nut in the housing without having to perform laborious changes to the construction thereof, the recirculating ball nut may be fixed in a detachable fashion in a turning sleeve rotatably mounted in the flow-around body. The turning sleeve more or less serves as an adapter for arranging the recirculating ball nut or, respectively, the entire adjusting means inside the housing. If the recirculating ball nut and the turning sleeve are detachably fastened, the recirculating ball nut can be easily dismounted and can be handled separately for the maintenance thereof or the like.

In order to be able to well associate and fix the recirculating ball nut and the turning sleeve with each other, the turning sleeve may be provided with a radially inwardly, at least partially projecting shoulder, to which a radially outwardly projecting contact flange of the recirculating ball nut can closely be fitted. Thus, the relative position between the recirculating ball nut and the turning sleeve is exactly defined.

For further simplifying the mutual attachment, the shoulder and the contact flange can be detachably connected with each other. Thus, the shoulder and the contact flange not only serve the relative positioning, but at the same time the attachment of both components.

For fixing the recirculating ball nut directly by the turning sleeve in an axial direction, the turning sleeve may be fixed in an axial direction.

For being capable of accommodating the adjusting means and the turning sleeve in the housing in an easy manner, the housing may comprise an interior space in which the driving means and the turning sleeve are disposed.

In order to realize, in this connection, the rotatable mounting of the turning sleeve and the recirculating ball nut in an easy manner, a pivot bearing means can be arranged between the outer wall of the turning sleeve and the wall of the interior space of the flow-around body.

A simple embodiment for such a pivot bearing means can be seen in that the same at least comprises one ball bearing. The ball bearing is preferably arranged along the outer circumference of the turning sleeve and is correspondingly fixed in the interior space.

The fixing may especially be performed by detachably fastening the pivot bearing means on the wall of the interior space.

A possibility for fastening the pivot bearing means, which can especially also absorb axial forces, can be seen in that the pivot bearing means fits closely to a shoulder of the wall at one of its ends and is attached, at its other end, relative to the wall at least in an axial direction. Said attachment at its other end may be removable, so that the pivot bearing means or, respectively, the at least one ball bearing can be removed easily.

A possibility for attaching the pivot bearing means on the wall is provided by associating a retaining ring at the other end of the pivot bearing means, which can be inserted in a corresponding groove in the wall of the interior space and retains the pivot bearing in contact with the shoulder of the wall.

In order to hold the turning sleeve on the pivot bearing stationary in an axial direction, a ring nut may externally be screwed onto a screwing end of the turning sleeve. In the corresponding functional position of the turning sleeve said ring nut fits closely to the pivot bearing means and prevents a displacement of the turning sleeve relative to the pivot bearing means.

For fixing the turning sleeve at both ends of the pivot bearing means in an axial direction the turning sleeve may be provided with a radially outwardly projecting stop spaced apart from the screwing end and fitting closely to the pivot bearing means opposite the ring nut. It is also possible, however, that the turning sleeve is fixed opposite the ring nut on the wall of the interior space, for example, by corresponding shoulders fitted closely thereto.

For being able to differently position and fix the turning sleeve relative to the pivot bearing means in an axial direction, a spacer ring may be arranged between the stop and the pivot bearing means. Said spacer ring may have different thicknesses in response to the desired relative position between the turning sleeve and the pivot bearing means.

For adjusting the flow restrictor the rotating spindle can directly be connected to the same. For being able to adjust, in dependence on the need, flow restrictors of different sizes and/or with different distances therebetween without having to modify the ball nut and the threaded spindle, the rotating spindle may be connected with an actuating piston, which is detachably connected with the flow restrictor. By the axial movement of the threaded spindle the actuating piston is likewise displaced in an axial direction correspondingly. On its end facing the flow restrictor the actuating piston may be designed to match the flow restrictor so as to produce a mutual connection. In dependence on the need, the actuating piston may moreover be chosen to have a corresponding length so as to connect flow restrictors positioned more closely or further away relative to the driving means with the rotating spindle.

The connection between the actuating piston and the rotating spindle may take place in different ways. For example, the actuating piston may be screwed onto the rotating spindle from the outside. Another example for the mutual attachment may be seen in that the rotating spindle and the actuating piston are engaged at their ends facing each other in a form-fitted manner and/or are screwed together. In this connection, the screwing may be realized with a corresponding stud or the like, which is screwed transversely to the axial direction into the ends of the rotating spindle and the actuating piston facing each other thereby connecting the same.

The flow restrictor may be designed differently. It may, for instance, be a needle as is described in DE 3409974. Moreover, the flow restrictor may be an axially movable perforated panel.

For being able to easily realize different flow rates with such a perforated panel, holes with different diameters may be formed in the perforated panel in an axial direction. Depending on the arrangement of the corresponding holes, the flow between the flow channel and the outlet is, therefore, differently large. In this connection it is possible that, for instance, a number of holes having the same diameter are each formed in the perforated panel along a line perpendicularly to the axial direction. In response to the movement of the perforated panel relative to the flow channel and the outlet the connection thereof is produced by holes having a corresponding diameter. The flow rate is varied in response to the diameters of the different holes.

A simple realization of such a perforated blend may be seen in that the same is designed as a hollow cylinder with holes arranged in the cylinder wall. The holes may, for instance, be arranged at identical intervals in the circumferential direction of the cylinder and may each have the same diameter along a circumferential line.

For being able to easily connect the hollow cylinder with the rotating spindle or the actuating piston, the hollow cylinder may comprise on its end facing the flow-around body an insertable cylinder being axially movable in a bearing bore. The rotating spindle and the actuating piston are connectable with said insertable cylinder. Moreover, the displacement of the insertable cylinder in the bearing bore results in a favorable guidance for the flow restrictor.

For facilitating the production of the flow restrictor the hollow cylinder and the insertable cylinder may have identical outer diameters. The flow restrictor may be made integrally and from a corresponding wear-resistant material.

For securely guiding the hollow cylindrical portion of the flow restrictor, in addition to the guidance of the insertable cylinder in the bearing bore, the hollow cylinder can be displaceably mounted in a cylindrical section of the outlet. Thus, the flow restrictor can more easily withstand the possibly high pressures in conveyor pipelines especially for the recovery of oil.

For being able to securely seal the flow channel against the outlet in the area of the flow restrictor, an inner wall of the cylindrical portion of the outlet may be formed by a sealing sleeve preferably made of metal.

For allowing a discharge out of the outlet of the housing into subsequent portions of a conveyor pipeline or the like as irrotational as possible the outlet may be conically expanded downstream of the cylindrical portion.

A simple possibility of connecting the rotating spindle or the actuating piston with the flow restrictor is to screw a free end of the actuating piston or the rotating spindle into an end bore of the insertable cylinder.

In order to exactly define a corresponding screwed position the end bore may be provided with a shoulder fitting closely to the free end or to a shoulder being apart from the free end in the screwed position.

For preventing the flow restrictor from turning relative to the insert bore or, respectively, to the actuating piston or the rotating spindle, a guide bore may be formed parallel to the end bore in the insertable cylinder, with which a guide pin is displaceably engaged.

For preventing that fluid penetrates into the bearing bore from the flow channel or the outlet, at least one sealing member can be disposed between the insertable cylinder and the inner wall of the bearing bore.

On the other hand, the fluid subjected to high pressure may also be used for supporting an axial displacement of the flow restrictor by the driving means, for instance, by that a flow channel intersperses the insertable cylinder in an axial direction. Through said flow channel the fluid may penetrate into the bearing bore so as to prevent that, given a displacement of the flow restrictor against the pressurization by the fluid, a correspondingly high advance force has to be applied by the driving means only.

For being able to arrange the different components of the driving means and also of the flow restrictor in or on the flow-around body, the flow-around body may be composed of one central body and two end bodies. After the disassembly of the end bodies especially the interior space of the flow-around body is freely accessible, which is substantially only formed in the central body.

In order to design the flow-around body in a fashion favorable for the flow, at least the inlet end body facing the inlet may be substantially shaped like a circular cone.

The flow-around is moreover improved, if a cone point of the inlet end body faces in the direction of the inlet and is arranged especially centrally to the inlet.

It is possible that the turning sleeve and/or the recirculating ball nut are at least partially arranged also in one of the end bodies. For achieving an easy to handle unit it can be regarded as favorable, however, if at least the recirculating ball spindle and the turning sleeve are arranged in the substantially cylindrical central body.

For being able to accommodate the driving means in the central body in a protected manner after the disassembly of the inlet end body, a locking plate may be provided between the central body and the inlet end body.

For being able to securely operate the driving means according to the invention automatically and especially remotely controlled, the recirculating ball nut can be movably connected with an electric drive. By said electric drive the recirculating ball nut is rotated together with the turning sleeve, and said rotation is converted into a translatoric movement of the rotating spindle and possibly the actuating piston and, thus, of the flow restrictor. The electric drive is precisely controllable, so that the flow restrictor can be positioned exactly and reproducibly.

For transmitting a rotational movement to the recirculating ball nut in an easy fashion, the same may be connected with a driving toothed wheel in a rotation-resistant manner, with the driving toothed wheel be rotatable by the electric drive. It is likewise possible that the driving toothed wheel forms a part of the recirculating ball nut.

For being able, however, to exchange the driving toothed wheel, if required, the same may be attached on the turning sleeve and/or the recirculating ball nut by means of a screw connection.

A simple possibility of realizing such an electric drive may be seen in that the same comprises at least one electric motor.

For easily achieving corresponding transmission ratios between the electric motor and the recirculating ball nut, and for rotating the recirculating ball nut with a possibly required high influence of forces at the same time, the driving toothed wheel may be constructed as a worm gear engaged with a worm shaft driven by the electric motor. Such a worm gear may be designed to be self-locking, so that a rotation of the worm gear and/or worm shaft is impossible without an actuation of the electric motor in both directions of rotation, or at least in one direction of rotation. The worm gear and the worm shaft may be paired differently. For example, a cylinder worm may be paired with a globoid worm wheel, an enveloping worm may be paired with a spur gear, or an enveloping worm may be paired with a globoid worm wheel.

For constructing the electric drive to be as safe as possible against failure and/or for increasing a power transmission onto the worm shaft, the worm shaft can be movably connected with one electric motor each at its end sections. Such an electric motor can, for example, be a stepper motor or the like.

The end sections of the worm shaft may be connected with corresponding drive shafts of the electric motors in a rotation-resistant manner. It is, however, also possible that the end sections of the shaft are directly constructed as drive shafts of the electric motors.

For rotatably mounting the worm shaft in a secure manner thereby allowing it to absorb corresponding forces, the end sections of the shaft may be mounted adjacent to the electric motors. Such bearings may be ball bearings and/or axial bearings.

For supplying, if necessary, all components inside the flow-around body, the flow-around body can comprise an outer sleeve with a radial extension extending at least to the inner wall of the flow channel. Electrical wires, supply lines, instrument leads or the like may be passed therethrough. Moreover, the radial extension may also be applied for conducting the flow, by, for instance, sub-dividing the fluid flowing from the inlet to the outlet into corresponding partial flows.

In order to allow, in this connection, that as few whirls as possible are formed during the flow in the radial extension, the same may be pointed at least at its end facing the inlet. The pointing Is designed such that it has a favorable effect on the flow.

As both aforementioned electric motors act on a shaft, a corresponding synchronization is advantageous if both electric motors are operated simultaneously. This can, for example, be realized electronically or by means of software.

For being able to disassemble the housing of the pressure reducer according to the invention to an extent to allow, for instance, an easy removal of the flow-around body, the housing can consist of two parts and the parts of the housing may be held together by a clamping ring along their outer circumference.

For being able to supply and control the electric motors of the electric drive directly from outside the flow-around body, the electric motors and the worm shaft can be arranged in an outwardly open transverse bore extending substantially vertically to the rotating spindle.

For being thereby able to lay corresponding electrical wires or other lines directly in the direction of the electric motors, the open ends of the transverse bore may each be associated with a radial extension of the outer sleeve, through which, again, corresponding electrical wires, supply lines, instrument leads or the like can be passed to the electric motors from outside the housing, protected, by said radial extensions, against the fluid flowing around the flow-around body.

Figure 2:
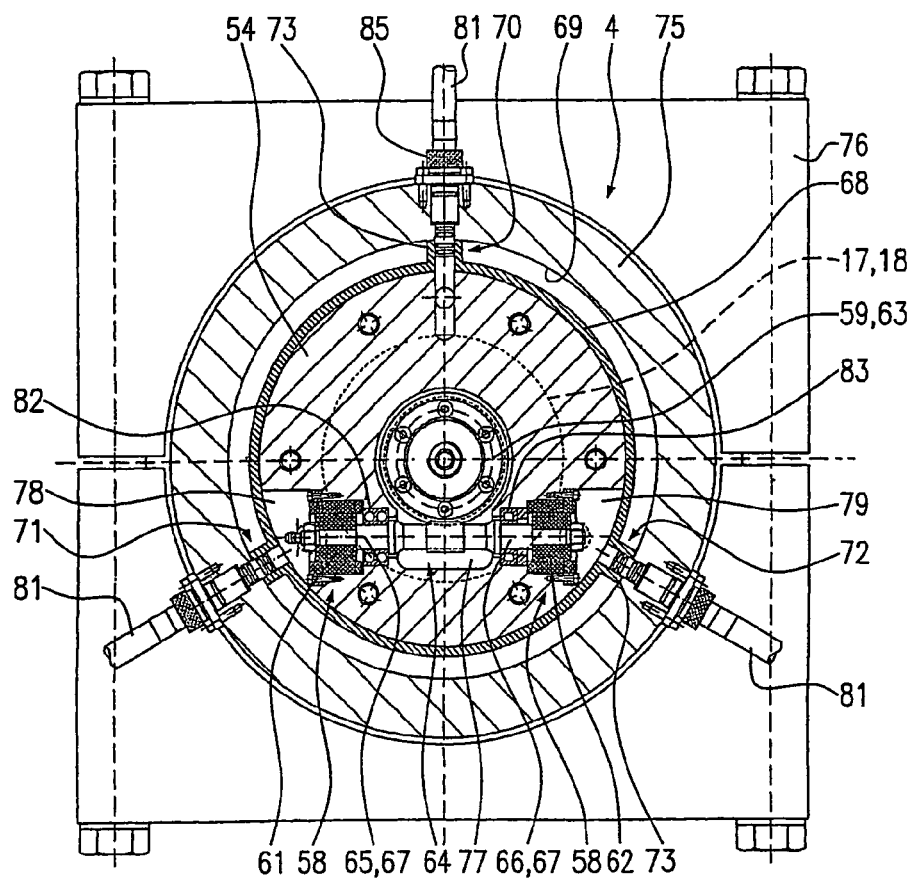

An advantageous embodiment of the invention will hereinafter be explained by means of the attached figures, wherein FIG. 1 shows a longitudinal section through an embodiment of a pressure reducer according to the invention, and FIG. 2 shows a section along line II-II through FIG. 1.

FIG. 1 illustrates a longitudinal section through an embodiment of the pressure reducer 1 according to the invention. Said pressure reducer 1 comprises a housing 4 formed of housing parts 74, 75. Said two parts of the housing are held together by a clamping ring 76 along their outer circumference.

The housing 4 comprises an inlet 2 at one end and an outlet 3 at the opposite end. Inside the housing 4, the inlet and the outlet are connected with each other by means of a flow channel 6. A flow-around body 5 is disposed in the flow channel 6. The flow-around body 5 is formed of a central body 52 and two end bodies 53, 54. The end body 53 is associated with the inlet 2 as inlet end body and has the shape of a circular cone. A corresponding cone point 55 faces the inlet 2 and is arranged centrally thereto. The other end body 54 is constructed as outlet end body in a substantially truncated fashion and comprises at its end facing outlet 3, substantially centrally, a bearing bore 37 open in the direction of the outlet 3.

A locking plate 56 is arranged between the inlet end body 53 and the central body 52, by which an interior space 14 of the central body 52 is sealed in the direction of the inlet end body 53. A position sensor 57 is disposed in the center of the locking plate 56. Said position sensor 57 comprises a piston 80 displaceably passed in an axial bore 84 of a rotating spindle 10 for determining the position of said rotating spindle.

In the area of the central body, and partially also in the area of the outlet end body 54, both are surrounded by an outer sleeve 68 along their outer circumference. Said outer sleeve 68 is attached at least to the outlet end body 54, e.g. by welding. The locking plate 56 is partially inserted into the outer sleeve 68, where it is sealed by corresponding sealing members. The outer sleeve 68 comprises (see also FIG. 2)

three radial extensions 70, 71 and 72. Said extensions extend with their ends 73 to an inner wall 69 of the flow channel 6. The radial extensions 70 to 72 comprise openings through which lines 81, such as electrical wires, supply lines, instrument leads or the like, can be passed from outside the housing 4. The lines 81 are screwed to the housing 4 externally thereof by means of a terminal 87.

An adjusting means 8 is arranged in the interior space 14 of the central body 52. Said adjusting means 8 comprises a recirculating ball nut 9, the rotating spindle 10 and an actuating piston 27. The recirculating ball nut 9 is arranged in a turning sleeve 11 and connected therewith in a rotation-resistant manner. The turning sleeve comprises a radially inwardly protruding shoulder 12, which closely fits to a correspondingly radially outwardly protruding contact flange 13 of the recirculating ball nut 9 in the position illustrated in FIG. 1. The contact flange 13 of the recirculating ball nut 9 is arranged approximately centrally on the recirculating ball nut 9 in an axial direction 32. Via shoulder 12 and contact flange 13 the recirculating ball nut 9 and the turning sleeve 11 are removably attached to each other by means of a screw connection 60 from a number of studs.

The turning sleeve 11 is rotatably mounted in the central body 52 by means of a pivot bearing means 17 between its outer wall 15 and a wall 16 of the interior space 14. The pivot bearing means 17 is formed, for instance, by at least one ball bearing 18. For fixing the turning sleeve 11 and thus the recirculating ball nut 9 in an axial direction 32 a ring nut 23 is screwed onto a screwing end 24 of the turning sleeve 11 facing the inlet 2. In its unscrewed position the ring nut 23 fits closely to one end 19 of the pivot bearing means 17. A stop 25 of the turning sleeve II is associated with the other end 21 of the pivot bearing means 17. A spacer ring 26 is arranged between said stop 25 and the end 21 of the pivot bearing means 17. Moreover, end 21 is partially adjacent a shoulder 20 of the interior space 14.

The pivot bearing means 17 Is fixed in an axial direction 32 relative to the central body 52 by closely fitting to a shoulder 20 on one hand and by a retainer ring 22 on the other hand.

Via the screw connection 60 a driving toothed wheel 59 is likewise connected with the turning sleeve 11 and the recirculating ball nut 9 in a rotation-resistant manner. Said driving toothed wheel is constructed as worm gear 63 being engaged with a corresponding worm shaft 64.

Inside the recirculating ball nut 9 the rotating spindle 10 is mounted rotatably and displaceably in an axial direction 32. The rotating spindle 10 protrudes with its end 28 from the recirculating ball nut 9 in the direction of the outlet 3. At this end 28 the rotating spindle 10 is detachably connected to the actuating piston 27. The connection is realized by a form-fitted engagement of the end 28 with a correspondingly facing end 29 of the actuating piston 27, and by additionally screwing the two ends together with studs 85.

The actuating piston 27 is passed through the outlet end body 54 to the flow restrictor 7. The actuating piston 27 protrudes into the bearing bore 37 and is inserted at its free end 43 into an end bore 44 of the flow restrictor 7, where it is screwed in a screwed position 46. The screwed, position 46 is defined by a radially outwardly protruding ring flange of the actuating piston 27 fitting closely to a corresponding radially inwardly protruding shoulder 45 of the end bore 44.

The bore 44 is formed in an insertable cylinder 38 of the flow restrictor 7. A hollow cylinder 34 joins with its end 36 the insertable cylinder 38 in the direction of the outlet 3, whereby the hollow cylinder 34 forms a perforated panel 30 with a plurality of holes 31 in its cylinder wall 35. In an axial direction 32 the holes 31 have different diameters 33. A number of holes 31 with the same diameters 33 is arranged along corresponding circumferential lines of the hollow cylinder 34. In the position illustrated in FIG. 1 no fluidic connection is provided between the flow channel 6 and the outlet 3 through the perforated panel 30. The hollow cylinder 34 is pushed forward into a cylindrical portion 40 of outlet 3, where the holes 31 are sealed as against the flow channel 6 by means of a sealing sleeve 42 forming an inner wall 41 of the cylindrical portion 40.

The hollow cylinder 34 and the insertable cylinder 38 have identical outer diameters 39. At least one sealing member 49 is arragened between the insertable cylinder 38 and an inner wall 50 of the bearing bore 37. Said element seals the bearing bore 37 against the flow channel 6.

A guide bore 47 and a flow channel 51 are formed in the insertable cylinder 38 parallel to the end bore 44. The guide bore 47 serves to displaceably accommodate a guide pin 48. Said guide pin 48 is inserted into the guide bore with one of its ends and fastened in the outlet end body 44 with its other end. The flow channel 51 connects the interior of the hollow cylinder 34 with the bearing bore 37.

A screwed sleeve 86 is arranged inside the end bore 44, into which the free end 43 of the actuating piston 27 can be screwed and which comprises the shoulder 45. It is also possible that the screwing and positioning of the free end 43 of the actuating piston 27 is realized directly inside the end bore 44 without interconnecting the screwed sleeve 86.

FIG. 2 is a section along line II-II through FIG. 1. Said figure particularly shows an electric drive 58 for the recirculating ball nut 9, which comprises two electric motors 61 and 62. In FIG. 1 and FIG. 2 identical parts have been provided with identical reference numbers and are partly explained in connection with one figure only.

The electric motors 61, 62 are arranged in a transverse bore 77 of the central body 52. The transverse bore 77 extends perpendicularly to the axial direction 32 or, respectively, perpendicularly to the rotating spindle 10. The worm shaft 64 is rotatably mounted inside the transverse bore 77. The worm shaft 64 comprises two end sections 65, 66 each of which is associated with an electric motor 61, 62. Each of the end sections of the shaft 65, 66 is constructed as a driving axle 67 rotatably received in the corresponding electric motor 61, 62. Adjacent the electric motors 61, 62 the worm shaft 64 is rotatably mounted by means of at least a radial bearing 82 and a radial bearing 83 on its end sections 65, 66. The transverse bore 77 comprises open ends 78, 79, wherein a radial extension 71, 72 of the outer sleeve 68 is associated with each of said ends. Corresponding lines 81 are passed through said radial extensions 71, 72 to the transverse bore 77 from outside the housing.

The electric motors 61, 62 are synchronized with each other so as to drive the worm shaft 64 at the same time. The electric motors may be stepper motors or other motors, and the synchronization may be realized electronically or by means of software.

In the open ends 78, 79 the electric motors 61, 62 are detachably fastened and connected with the corresponding lines 81 for supply and control purposes.

The operation of the pressure reducer according to the invention will hereinafter be briefly explained by means of the figures.

For adjusting the flow restrictor 7 in the direction of the inlet 2, the electric motors 61, 62 are operated by remote control. When operating the electric motors 61, 62 the worm shaft 64 rotates correspondingly, and so does, via the engagement thereof with the worm gear 63, the recirculating ball nut 9. When the recirculating ball nut 9 rotates, the rotating spindle 10 is displaced in an axial direction 32. In FIG. 1 the rotating spindle 10 and, correspondingly, the flow restrictor 7 are illustrated in a locked position, in which no fluidic connection between the flow channel 6 and the outlet 3 is provided.

Given a corresponding rotation of the recirculating ball nut 9 the rotating spindle 10 and likewise the actuating piston connected therewith is, according to FIG. 1, displaced to the right-hand side in the direction of the inlet 2. By said displacement the flow restrictor 7 connected with the free end 43 of the actuating piston 27 is likewise displaced in the direction of the inlet 2. Thus, a fluidic connection between the flow channel 6 and the outlet 3 is produced via more or fewer holes 31 with partially different diameters 33. A corresponding flow rate between the flow channel 6 and the outlet 3 is determined by the number of the holes 31 and the diameters 33 thereof.

If the flow restrictor 7 is again displaced into the position according to FIG. 1, a fluidic connection between the flow channel 6 and the outlet 3 is again correspondingly interrupted.

In accordance with the invention the adjustment of the flow restrictor 7 is realized by the rotation of the recirculating ball nut 9 and particularly by the engagement of the worm gear 63 with the worm shaft 64, whereby the worm shaft 64 is rotatable by two synchronized electric motors 61, 62. Thus, an exact and reproducible displacement of the flow restrictor 7, especially by remote control, is feasible. The corresponding position of the flow restrictor 7 is determined by the axial displacement of the rotating spindle 10 by the position sensor 57.

The invention claimed is:

1. A pressure reducer comprising:
a housing having an inlet and an outlet, in which a flow-around body is arranged in a flow channel connecting the inlet and the outlet,
a flow restrictor adjustably mounted relative to the flow-around body for varying a flow rate and movably connected with an adjusting means having a recirculating ball nut substantially fixed in an axial direction and rotatably mounted in the flow-around body and a rotating spindle axially adjustably mounted in the recirculating ball nut, wherein the rotating spindle is movably connected with the flow restrictor,
the recirculating ball nut being detachably fastened in a turning sleeve rotatably mounted in the flow-around body and the recirculating ball nut being connected with a driving toothed wheel in a rotation-resistant manner, which is rotatable by an electric drive for the movable connection with the recirculating ball nut.

2. The pressure reducer according to claim 1, wherein the turning sleeve is fixed in a radial direction.

3. The pressure reducer according to claim 1, wherein the turning sleeve and the recirculating ball nut are arranged in an interior space of the flow-around body.

4. The pressure reducer according to claim 1, wherein a cone point of the inlet end body faces in the direction of the inlet and is arranged particularly centrally to the inlet.

5. The pressure reducer according to claim 1, wherein the driving toothed wheel is fastened with the turning sleeve and/or the recirculating ball nut by a screwed connection.

6. The pressure reducer according to claim 1, wherein the housing is formed of two parts and the parts of the housing are held together by a clamping ring along their outer circumference.

7. The pressure reducer of claim 1, further comprising the flow restrictor being adjustably mounted downstream relative to the flow-around body.

8. The pressure reducer according to claim 1, wherein the turning sleeve includes a radially inwardly, at least partially protruding shoulder closely fitting to a radially outwardly protruding contact flange of the recirculating ball nut.

9. The pressure reducer according to claim 8, wherein the shoulder and contact flange are detachably connected with each other.

10. The pressure reducer according to claim 1, wherein the rotating spindle is connected with an actuating piston being detachably connected with the flow restrictor.

11. The pressure reducer according to claim 10, wherein the rotating spindle and the actuating piston engage each other with their ends facing each other in a form-fitted manner and/or are screwed to each other.

12. The pressure reducer according to claim 1, wherein the flow-around body directly or an outer sleeve arranged thereon includes at least one radial extension extending to the inner wall of the flow channel.

13. The pressure reducer according to claim 12, wherein electrical wires, supply lines or the like are passed through the extension into the flow-around body.

14. The pressure reducer according to claim 12, wherein the radial extension is pointed at least at its end facing the inlet.

15. The pressure reducer according to claim 1, wherein a pivot bearing means is arranged between the outer wall of the turning sleeve and walls of the interior space of the flow-around body.

16. The pressure reducer according to claim 15, wherein the pivot bearing means includes at least one ball bearing.

17. The pressure reducer according to claim 15, wherein the pivot bearing means is detachably fastened on the wall of the interior space.

18. The pressure reducer according to claim 15, wherein the pivot bearing means closely fits to a shoulder of the wall with one of its ends and is fixed relative to the wall at least in an axial direction at its other end.

19. The pressure reducer according to claim 15, wherein a retaining ring is associated at the other end of the pivot bearing means.

20. The pressure reducer according to claim 15, wherein a ring nut can be screwed onto a screwing end of the turning sleeve.

21. The pressure reducer according to claim 20, wherein the turning sleeve includes a radially outwardly protruding stop spaced apart from the screwing end.

22. The pressure reducer according to claim 21, wherein a spacer ring can be arranged between the stop and the pivot bearing means.

23. The pressure reducer according to claim 1, wherein the flow-around body includes a central body and two end bodies.

24. The pressure reducer according to claim 23, wherein at least the inlet end body facing the inlet is substantially shaped like a circular cone.

25. The pressure reducer according to claim 23, wherein at least the recirculating ball nut and the turning sleeve are arranged in the substantially cylindrical central body.

26. The pressure reducer according to claim 23, wherein a locking plate is arranged between the central body and the inlet end body.

27. The pressure reducer according to claim 26, wherein a position sensor is arranged approximately centrally to the locking plate.

28. The pressure reducer according to claim 1, wherein the electric drive includes at least one electric motor.

29. The pressure reducer according to claim 28, wherein the driving toothed wheel is constructed as a worm gear being engaged with a worm shaft driven by the electric motor.

30. The pressure reducer according to claim 29, wherein the worm shaft is movably connected with an electric motor on each of its end sections.

31. The pressure reducer according to claim 30, wherein the end section of the shaft is constructed as driving axle of the electric motor.

32. The pressure reducer according to claim 30, wherein the end sections of the shaft are mounted adjacent the electric motors.

33. The pressure reducer according to claim 30, wherein the electric motors and the worm shaft are arranged in an outwardly open transverse bore extending substantially perpendicularly to the rotating spindle.

34. The pressure reducer according to claim 33, wherein a radial extension is associated with each of the open ends of the transverse bore.

35. The pressure reducer according to claim 1, wherein the flow restrictor is an axially displaceable perforated panel.

36. The pressure reducer according to claim 35, wherein holes with different diameters are formed in the perforated panel in an axial direction.

37. The pressure reducer according to claim 35, wherein the perforated panel is constructed as a hollow cylinder with holes arranged in the cylinder wall.

38. The pressure reducer according to claim 37, wherein the hollow cylinder is displaceably mounted in a cylindrical portion of the outlet.

39. The pressure reducer according to claim 38, wherein an inner wall of the cylindrical portion is formed by a sealing sleeve.

40. The pressure reducer according to claim 38, wherein the outlet conically expands downstream of the cylindrical portion.

41. The pressure reducer according to claim 37, wherein the hollow cylinder includes at its end facing the flow-around body an insertable cylinder axially displaceable in a bearing bore.

42. The pressure reducer according to claim 41, wherein the hollow cylinder and the insertable cylinder have identical outer diameters.

43. The pressure reducer according to claim 41, wherein at least one sealing member is arranged between the insertable cylinder and the inner wall of the bearing bore.

44. The pressure reducer according to claim 41, wherein a flow channel intersperses the insertable cylinder in an axial direction.

45. The pressure reducer according to claim 41, wherein the rotating spindle is connected with an actuating piston being detachably connected with the flow restrictor and wherein a free end of the actuating piston or the rotating spindle is screwed into an end bore of the insertable cylinder.

46. The pressure reducer according to claim 45, wherein the end bore includes a shoulder for defining a screwed position of the free end.

47. The pressure reducer according to claim 45, wherein a guide bore is formed parallel to the end bore in the insertable cylinder with which a guide pin is displaceably engaged.

48. A pressure reducer comprising:
a housing comprising an inlet, an outlet, and a housing axis extending from the inlet to the outlet;
a flow-around body disposed in the housing to at least partially define an annular chamber in fluid communication with the inlet and outlet;
a moveable flow restrictor disposed in a fluid pathway between the inlet and the outlet; and
an actuation mechanism disposed in the flow-around body, coupled to the moveable flow restrictor, and configured to at least partially define the position of the flow restrictor with respect to the inlet and outlet; and
wherein the actuation mechanism comprises:
a first gear configured to rotate about a first axis;
a second gear configured to rotate in response to rotation of the first gear and configured to rotate about a second axis;
a threaded spindle configured to move in a direction along the second axis in response to actuation of second gear to change the position of the flow restrictor;
wherein the direction of rotational force applied to the second gear is parallel with the first axis; and
an electric drive; and,
the first gear being coupled to the electric drive.

49. The pressure reduced of claim 48, wherein the second gear comprises a ring gear fixed in rotation with respect to a ball nut, the ball nut being in engagement with the threaded spindle.

50. The pressure reducer of claim 48, comprising a torque-generating component disposed in the flow-around body.

51. The pressure reducer of claim 50, wherein the torque-generating component comprises at least one electric motor.

52. A pressure reducer comprising:
a housing comprising an inlet, an outlet, and a housing axis extending from the inlet to the outlet;
a flow-around body disposed in the housing to at least partially define an annular chamber in fluid communication with the inlet and outlet;
a moveable flow restrictor disposed in a fluid pathway between the inlet and the outlet; and
an actuation mechanism disposed in the flow-around body, coupled to the moveable flow restrictor, and configured to at least partially define the position of the flow restrictor with respect to the inlet and outlet; and
wherein the actuation mechanism comprises:
a first gear configured to rotate about a first axis;
a second gear configured to rotate in response to rotation of the first gear and configured to rotate about a second axis;
a threaded spindle configured to move in a direction along the second axis in response to actuation of second gear to change the position of the flow restrictor;
wherein the first and second axes respectively extend in first and second planes that are non-perpendicular with respect to one another and wherein the first plane is non-perpendicular to the housing axis; and
an electric drive; and,
the first gear being coupled to the electric drive.

* * * * *